US007000472B2

(12) United States Patent
Kinoshita (10) Patent No.: US 7,000,472 B2
(45) Date of Patent: Feb. 21, 2006

(54) SUPPORTING MECHANISM FOR A VIBRATOR AND A VIBRATOR UNIT INCLUDING A SUPPORTING MECHANISM

(75) Inventor: Yusuke Kinoshita, Minowa-machi (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/857,066

(22) Filed: May 28, 2004

(65) Prior Publication Data

US 2005/0262940 A1 Dec. 1, 2005

(30) Foreign Application Priority Data

May 28, 2004 (JP) ............................. 2003-151295

(51) Int. Cl.
*G01P 9/04* (2006.01)
*G01C 19/56* (2006.01)
(52) U.S. Cl. ............................. 73/504.12; 73/504.16
(58) Field of Classification Search ............ 73/504.02, 73/504.04, 504.12, 504.13, 504.14, 504.15, 73/504.16
See application file for complete search history.

(56) References Cited

U.S. PATENT DOCUMENTS

| 6,205,857 | B1 | 3/2001 | Nakajima |
| 6,227,048 | B1 * | 5/2001 | Kikuchi et al. .......... 73/504.12 |
| 6,698,292 | B1 * | 3/2004 | Kikuchi ....................... 73/662 |
| 6,708,564 | B1 * | 3/2004 | Ishikawa et al. .............. 73/493 |
| 2001/0020388 | A1 | 9/2001 | Inoue et al. |
| 2003/0141340 | A1 * | 7/2003 | Ishikawa et al. ............. 228/4.5 |

FOREIGN PATENT DOCUMENTS

| CN | 1205096 A | 1/1999 |
| EP | 0 930 482 A2 | 7/1999 |
| EP | 0862 156 | 4/2005 |
| JP | 3-198003 | 8/1991 |
| JP | 2003-294450 | 10/2003 |

* cited by examiner

*Primary Examiner*—Helen Kwok
(74) *Attorney, Agent, or Firm*—Anderson Kill & Olick, PC (57) ABSTRACT

A gyro-vibrator supporting mechanism for supporting a gyro-vibrator via a support section upon a substrate in a vibration unit in which a vibrator is installed, the gyro-vibrator having a drive section to which a Coriolis force is applied upon an angular rotation of the gyro-vibrator with the drive section vibrating in a first direction, the detection section vibrating in a second direction perpendicular to said first direction in response to said Coriolis force and in accordance with the magnitude of said Coriolis force for detecting the strength of the Coriolis force and said gyro-vibrator rotating about an axis in a third direction perpendicular to said first and second directions and including a support section for supporting said drive section and said detection section relative to the substrate, and wherein the supporting mechanism comprises a characteristic resonance frequency of vibration along at least one of the first and the second directions that is lower than a characteristic resonance frequency of vibration along a direction other than the at least one of the first and the second directions.

12 Claims, 5 Drawing Sheets

SUPPORTING MECHANISM FOR A VIBRATOR AND A VIBRATOR UNIT INCLUDING A SUPPORTING MECHANISM

FIELD OF THE INVENTION

The present invention relates to a supporting mechanism for supporting a vibrator such as a gyro vibrator (gyroscopic piezoelectric vibrator) which is used for detecting the orientation, speed, and position of an object, and to a vibrator unit including a vibrator and a vibrator supporting mechanism.

BACKGROUND OF THE INVENTION

A gyro vibrator includes a drive section, a detection section and a support section for supporting the drive and detection sections respectively. In a gyro vibrator a Coriolis force is applied to the drive section in accordance with the rotation of the gyro vibrator when the drive section is vibrating along a certain direction. The detection section vibrates in response to the Coriolis force with an amplitude corresponding to the strength of the Coriolis force. The gyro vibrator is mounted on a substrate on which a supporting mechanism is provided for supporting the supporting section.

The supporting mechanism as described above is used to rigidly support the gyro vibrator. This limits or inhibits vibration of the drive section or the detection section of the gyro vibrator. If the degree of rigidity of the supporting mechanism is lowered to ease the inhibition of vibration, a problem of reliability results and the gyro vibrator becomes susceptible to shock.

SUMMARY OF THE INVENTION

The present invention is a supporting mechanism for supporting a gyro-vibrator having a drive section to which a Coriolis force is applied caused by the vibration of the drive section in a first direction in accordance with an applied rotation of the gyro vibrator, a detection section that vibrates in a second direction perpendicular to the first direction in response to the Coriolis force applied to the drive section for detecting the strength of the Coriolis force and a support section for supporting said drive section and said detection section, wherein the supporting mechanism comprises a characteristic resonance frequency of vibration along at least one of the first and the second directions that is lower than a characteristic resonance frequency of vibration along a direction other than the at least one of the first and the second directions.

Another embodiment of the invention is a vibrator unit including a supporting mechanism for supporting a gyro-vibrator via a support section provided on a substrate with the gyro-vibrator comprising a drive section to which a Coriolis force is applied caused by the vibration of the drive section along a first direction in accordance with rotation of the gyro-vibrator about an axis in a second direction perpendicular to the first direction and a detection section that vibrates in a third direction perpendicular to the first and the second directions, in response to the Coriolis force applied to the drive section for detecting the strength of the Coriolis force, with the support section supporting the drive section and the detection section wherein the drive section comprises first and second drive arm sections shaped like rods disposed in a direction parallel to the third direction and being parallel to each other, and a drive arm supporting section shaped like a rod having two opposite ends, with one end thereof connected to the first drive arm section, the opposite end thereof being connected to the second drive arm section and with the drive arm supporting section connected at an intermediate location to the detection section, and with the detection section comprising a detection arm shaped like a rod disposed between and parallel to the first and the second drive arm sections, and the supporting mechanism comprising a first elastic mechanism for supporting the gyro-vibrator and for supporting the drive arm supporting section and the detection arm section at the center thereof.

The first elastic mechanism has a characteristic resonance frequency of vibration along the third direction. The vibrator supporting mechanism in the above embodiment may further comprise a second elastic mechanism having a characteristic resonance frequency of vibration along the first direction that is lower than the characteristic resonance frequency of vibration of the first elastic mechanism along the third direction.

The second elastic mechanism may be of a width which is narrower then the width of the first elastic mechanism or may be of uneven width or have a section of different width.

Each of the first and the second elastic mechanisms may have a hollow section.

Each of the first and the second elastic mechanisms may have a flectional section.

The first elastic mechanism and the second elastic mechanism are each composed of a material composition such that the characteristic resonance frequency of the second elastic mechanism is lower than the characteristic resonance frequency of the first elastic mechanism.

BRIEF DESCRIPTION OF THE DRAWINGS

The invention is hereinafter described with reference to the accompanying drawings of which.

DESCRIPTION OF THE FIRST EMBODIMENT OF THE INVENTION

FIGS. 1–4 are illustrative of the first embodiment of the invention.

Figure 1A:
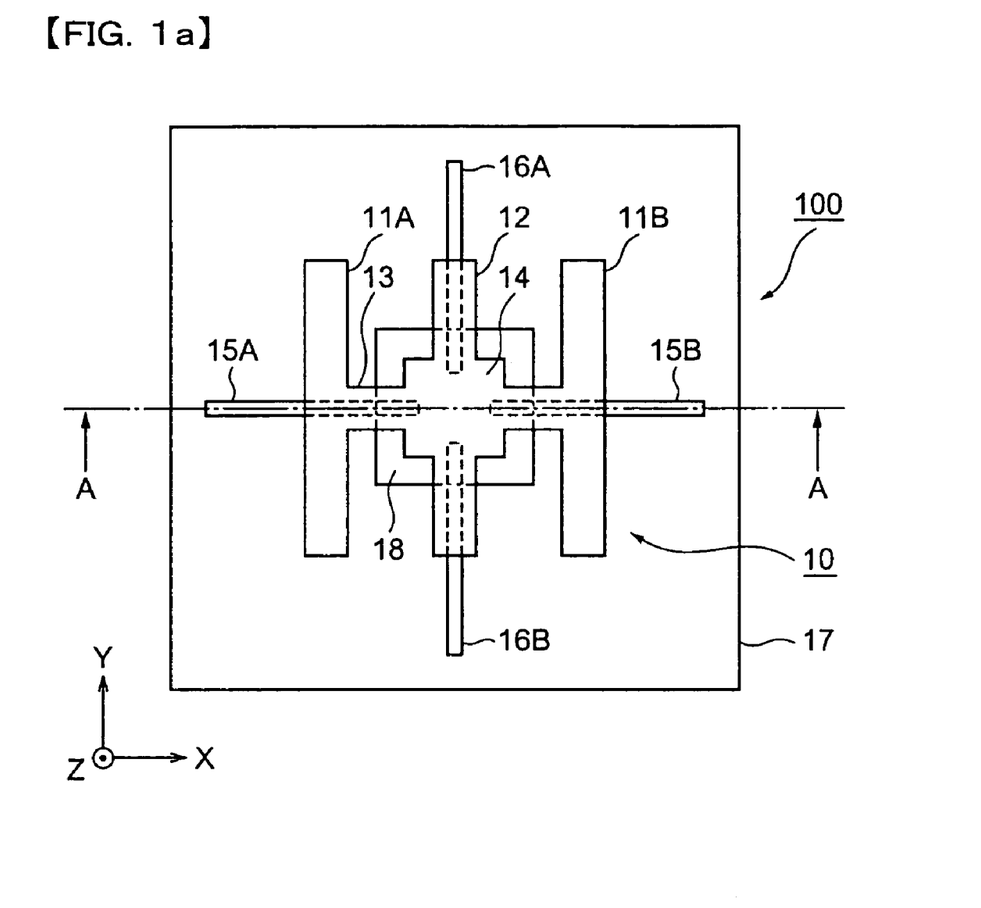
FIG. 1(a) is a plan view of a vibrator unit equipped with a gyro vibrator according to a first embodiment.
Figure 1B:
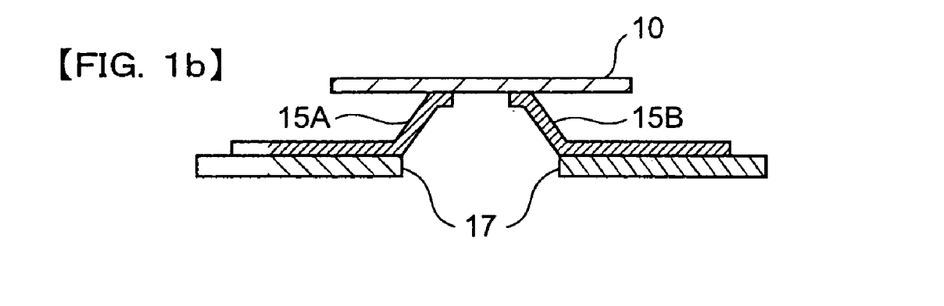
FIG. 1(b) is a cross-sectional view of the vibrator unit taken along the section lines AA in FIG. 1(A).

A vibrator unit 100 is mounted on an object (not shown) such as, for example, an electronic device or a vehicle to detect the orientation, speed, and position of the object. The vibrator unit 100 comprises a gyro vibrator 10 preferably of piezoelectric quartz, a supporting substrate 17 and lead wires 15A, 15B, 16A, and 16B forming a supporting mechanism for supporting the gyro vibrator 10, on the supporting substrate 17.

The gyro vibrator 10 includes, as shown in FIG. 1(A), a drive section having a first drive arm 11A and a second drive arm 11B respectively corresponding to a first drive arm section and a second drive arm section, a detection arm 12 representing a detection section, an arm supporting section 13 representing an arm supporting section, and a supporting board 14 representing a supporting section. The gyro vibrator 10 operates in three modes conventionally known to those skilled in the art as the drive mode, detection mode, and spurious mode respectively. The drive arms 11A and 11B vibrate by piezoelectric effect caused by an electric field between electrodes associated with or on the drive arms. A Coriolis force is generated in response to the vibration of the drive arms 11A and 11B due to inertial force caused by the rotation of the Earth in accordance with an applied rotation of the gyro vibrator 10. The detection section will vibrate in a direction perpendicular to the direction of vibration of the drive section in accordance with the strength of the Coriolis force permitting detection of the strength of the Coriolis force.

The first and the second drive arms 11A, 11B are, as shown in FIG. 1(A), are elongated board like members having a rectangular shape of predetermined length oriented parallel to each other in the Y direction. If rotation of the gyro-vibrator 10 occurs around the Z axis as shown in the drawing, during vibration of the first and the second drive arms 11A, 11B along the X direction as shown in the drawing, the vibration of the drive arms 11A, 11B will generate the Coriolis force corresponding to the amount of the rotation of the gyro-vibrator 10.

Figure 2A:
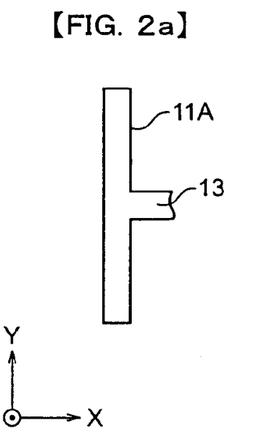
FIGS. 2(a) through 2(c) are schematic views showing an action of a drive arm.
Figure 2B:
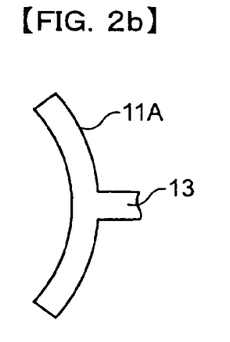
Figure 2C:
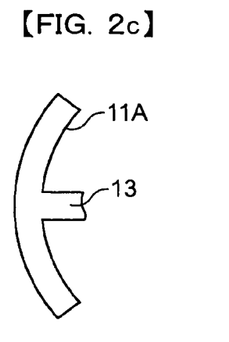

FIGS. 2(a) through 2(c), illustrate the vibrating action of the drive arm 11A The drive arm 11A vibrates around the center thereof causing the shape of the drive arm 11A to deform in a reciprocating manner from a normally vertical shape as shown in FIG. 2(a) into a convex shape as shown in FIG. 2(b) and then bend into a concave shape as shown in FIG. 2(c). The vibrating action, causes a displacement of the drive arm 11A along the X axis at the nearer position of one edge thereof which is larger than the displacement along the X axis at the further position from the edge. Because the arms are symmetrical, either edge of the drive arm may be used to measure this displacement. The drive arm 11B vibrates so as to bend axisymmetrically relative to the drive arm 11A.

Figure 3:
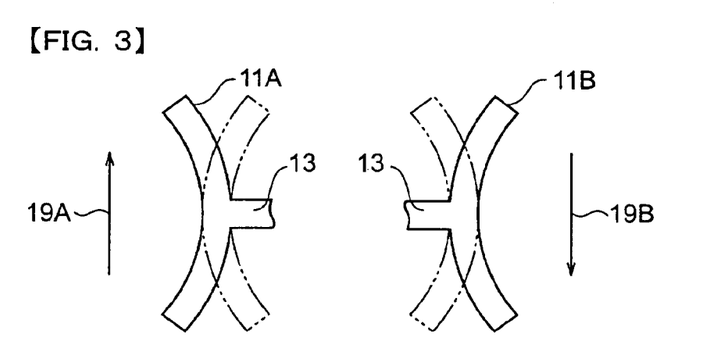
FIG. 3 is a schematic view showing the relationship between the action of the drive arm and a Coriolis force.

FIG. 3 shows the relationship between the action of the drive arm and the Coriolis force. As shown in FIG. 3, when the first drive arm 11A deforms from the shape illustrated by a broken line to the shape illustrated by a solid line and the second drive arm 11B also deforms from the shape illustrated by a broken line to the shape illustrated by a solid line, a Coriolis force along the arrows 19A and 19B is generated in response to the application of clockwise rotation of the gyro-vibrator 10 in the plane of the drawing. In contrast, when the first drive arm 11A deforms from the shape illustrated by a solid line to the shape illustrated by a broken line and the second drive arm 11B also deforms from the shape illustrated by a solid line to the shape illustrated by a broken line, the Coriolis force in the opposite direction to the arrows 19A and 19B is generated in response to application of clockwise rotation in the plane of the drawing.

The detection arm 12 has a configuration, similar to the first drive arm 11A and the second drive arm 11B, of that of a board member of rectangular geometry having a predetermined length and extending along the Y direction as shown in the drawing. The first drive arm 11A, the second drive arm 11B, and the detection arm 12 are preferably parallel to each other. When the first and the second drive arms 11A, 11B, are vibrating and the gyro-vibrator 10 is rotated the detection arm 12 will vibrate in response to a generated Coriolis force with the amplitude of vibration corresponding to the strength of the Coriolis force.

Figure 4A:
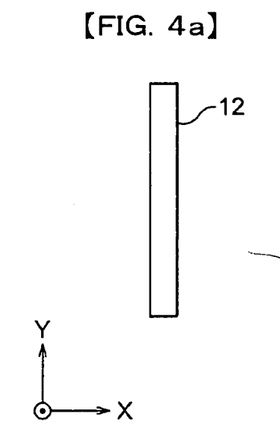
FIGS. 4(a) through 4(c) are schematic views showing an action of a detection arm.
Figure 4B:
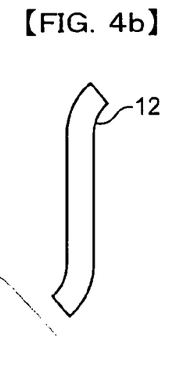
Figure 4C:
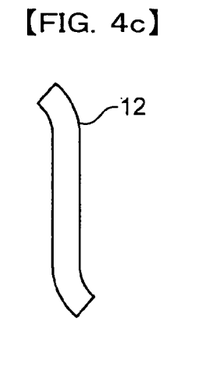

FIG. 4(a)–4(c) illustrates the vibrating action of the detection arm 12. The detection arm 12 performs a bending action in which it is deformed from a letter "S" shape to a reverse letter "S" shape in a manner similar to the bending action of the first and the second drive arms 11A, 11B as shown in FIGS. 3(a) through 3(c) respectively. The Coriolis force is sensed by detecting an electric signal (not shown) generated by the rotational bending action of the detection arm 12, in response to the amplitude of rotation of the gyro-vibrator 10 which permits measurement of the magnitude of the rotary angular velocity applied to an object.

Returning to FIG. 1(a), one end of the arm supporting section 13 is connected to the center of the first drive arm 11A and the opposite end thereof is connected to the center of the second drive arm 11B. The detection arm 12 is connected to the supporting section 13 at an intermediate location such that the center thereof corresponds to the center of the arm supporting section 13. The supporting board 14 is a plate like board having a predetermined surface area which interconnects the arm supporting section 13 and the detection arm 12 at the point of intersection.

The lead wires 15A, 15B extending in the X direction and the lead wires 16A and 16B extending in the Y direction are strip like members of the same shape. Further, one end of each of the lead wires 15A, 15B is, as shown in FIGS. 1(a) and 1(b), connected to the supporting board 14 on one side thereof while the other end of the lead wires 15A, 15B is connected to the supporting substrate 17. The lead wires are configured so as to prevent the vibrator 10 and the supporting substrate 17 from abutting on each other in the X direction. As is the case with the lead wires 15A, 15B, one end of each of the lead wires 16A, 16B is connected to the supporting board 14 and the other end is connected to the supporting substrate 17, and are configured so as to prevent the vibrator 10 and the supporting substrate 17 from abutting on each other in the Y direction. of the lead wires 15A, 15B The supporting substrate 17 may be, for example, composed of an insulating material such as a polyimide resin. conventionally known to the public. The supporting substrate 17 has a plurality of openings 18 permitting a heating tool (not shown) to be inserted therethrough to connect the lead wires 15A and so on to the supporting board 14.

The lead wires 15A and 15B are made of a material having a characteristic resonance frequency along the X direction lower than the characteristic resonance frequency of the lead wires 16A and 16B along the Y direction. Namely, the stiffness of the lead wires 15A and 15B in supporting the gyro vibrator 10 in the X direction is lower than the stiffness of the lead wires 16A and 16B in supporting the gyro vibrator 10 in the Y direction.

As described above, according to the vibrator unit of the first embodiment, since the supporting mechanism has a lower characteristic resonance frequency in the X direction than that in the Y direction, the vibration of the detection arm 12 along the X direction necessary for detecting the Coriolis force applied to the drive arms 11A, 11B can be prevented from being hindered, thus enabling detection of the ampli-

Second Embodiment

Figure 5A:
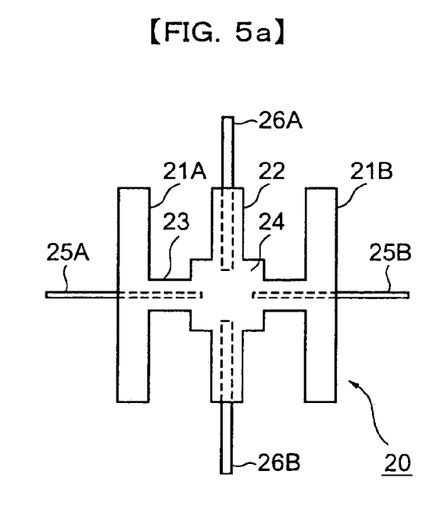
FIGS. 5(a) and 5(b) are plan views of vibrator units according to a second embodiment.
Figure 5B:
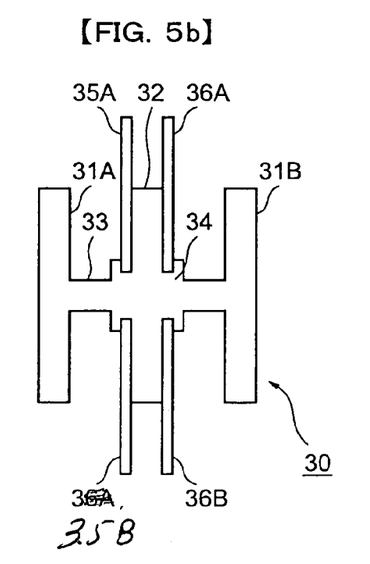

FIGS. 5(a) and 5(b) show a vibrator unit according to a second embodiment. As shown in FIG. 5(A), a gyro vibrator 20 according to the second embodiment comprises a first drive arm 21A, a second drive arm 21B, a detection arm 22, an arm supporting section 23, and a supporting board 24 respectively all of which have substantially the same function as the counterpart first drive arm 11A, the second drive arm 11B, the detection arm 12, the arm supporting section 13, and the supporting board 14 forming the gyro vibrator 10 shown in FIG. 1(a). The gyro vibrator 20 is supported by lead wires 25A and 25B for supporting the gyro vibrator 20 in the X direction and by lead wires 26A and 26B for supporting the gyro vibrator 20 in the Y direction as is the case with the gyro vibrator 10 in which the supporting board 14 is supported by the lead wires 15A, 15B, 16A, and 16B in the X and Y directions.

The width of the lead wires 25A and 25B which form the second elastic mechanism is narrower then the lead wires 26A and 26B which form the first elastic mechanism. Thus, since the supporting mechanism has a lower characteristic resonance frequency of vibration in the X direction than in the Y direction, the detection arm 22 is not prevented from vibrating along the X direction to detect the Coriolis force acting on the drive arms 21A and 21B.

Another gyro vibrator 30 according to the second embodiment, as shown in FIG. 5(b), comprises a first drive arm 31A, a second drive arm 31B, a detection arm 32, an arm supporting section 33, and a supporting board 34 respectively all of which have substantially the same function as the counterpart first drive arm 11A, the second drive arm 11B, the detection arm 12, the arm supporting section 13, and the supporting board 14 forming the gyro vibrator 10 shown in FIG. 1(a). In this arrangement the gyro vibrator 30 is supported only by lead wires 35A, 35B, 36A, and 36B aligned in the Y direction for supporting the gyro vibrator 30 in the Y direction and is not supported in the X direction.

The lead wires 35A and 35B lie parallel to each other and to the lead wires 36A and 36B, forming the first elastic mechanism, to support the gyro vibrator 30 only in the Y direction. Therefore, the detection arm 32 is not at all prevented from vibrating in the X direction to detect the Coriolis force acting on the drive arms 31A and 31B.

As described above, according to the vibrator unit of the second embodiment, since the gyro vibrator 20 is supported by the lead wires 26A and 26B in the Y direction and is supported in the X direction by the lead wires 25A and 25B and have a lower characteristic resonance frequency than that of the lead wires 26A and 26B, the vibration of the detection arm 22 along the X direction can be prevented from being hindered as is the with the detection arm 12 of the vibrator unit 10 according to the first embodiment, thus enabling detection of the amplitude of rotation applied from outside with greater accuracy than the convention.

Furthermore, according to the other vibrator unit of the second embodiment, since the gyro vibrator 30 is supported only in the Y direction by the lead wires 35A, 35B, 36A, and 36B and is not supported in the X direction, namely there is no limitation in moving in the X direction, the vibration of the detection arm 32 along the X direction is not hindered, thus, as a result, enabling detection of the amplitude of rotation applied from outside with greater accuracy compared to conventional practice.

Third Embodiment

Figure 6A:
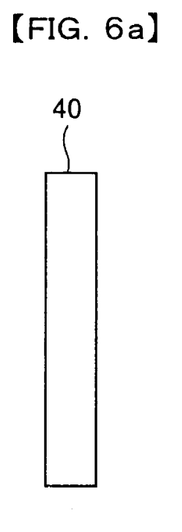
FIGS. 6(a) through 6(d) are schematic views showing structures of lead wires for supporting a gyro vibrator according to a third embodiment of the invention.

FIGS. 6(a) through 6(d) show different lead wires structural configurations for supporting a gyro vibrator according to this third embodiment of the subject invention. As shown in FIG. 6(A), a lead wire 40 having substantially the same function as the lead wire 15A in the first embodiment or the like has a smaller thickness (depth-wise in the drawing sheet) than the thickness of lead wire 15A or the like.

Figure 6B:
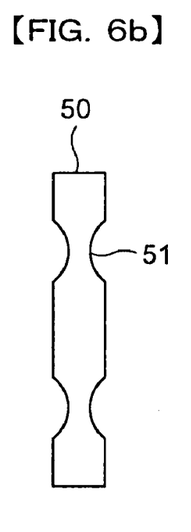

As shown in FIG. 6(b), a lead wire 50 having substantially the same function as the lead wire 15A in the first embodiment or the like has at least one narrower section 51 along the longitudinal direction. In other words, the width of the lead wire 50 is uneven since the narrower section has the different width from the rest thereof. As an example of the narrower section, a concave shape as shown in the drawing or a wedge shape can be cited.

Figure 6C:
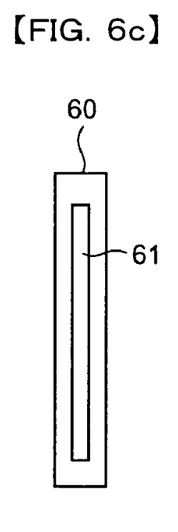

As shown in FIG. 6(c), a lead wire 60 having substantially the same function as the lead wire 15A in the first embodiment or the like has a hollow section 61 along the longitudinal direction.

Figure 6D:
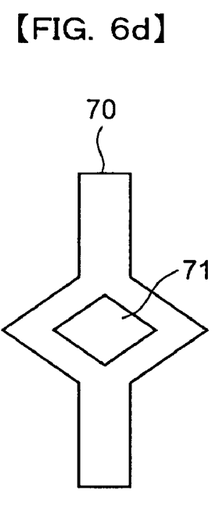

As shown in FIG. 6(d), a lead wire 70 having substantially the same function as the lead wire 15A in the first embodiment or the like has a rhombic opening 71 at the center thereof instead of the hollow section 61 along the longitudinal direction.

As described above, according to the vibrator unit having the lead wires of the third embodiment, since the gyro vibrator is supported by the lead wires 40, 50, 60, and 70 having structures which bend easily, the vibration for detecting of the detection arm is not hindered, thus enabling detection of the amplitude of rotation applied from outside with greater accuracy compared to a conventional vibrator unit.

Fourth Embodiment

Figure 7:
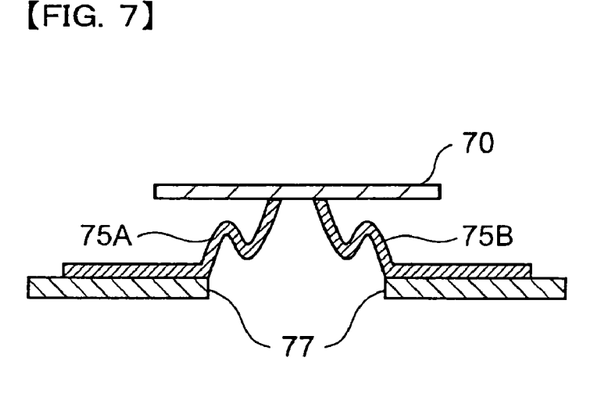
FIG. 7 is a cross-sectional view showing the structure of a vibrator unit according to a fourth embodiment.

FIG. 7 is a cross-sectional view showing the structure of a vibrator unit according to the fourth embodiment. As shown in FIG. 7, the vibrator unit of the fourth embodiment comprises a gyro vibrator 70, lead wires 75A and 75B, and a supporting substrate 77 respectively with each having substantially the same functions as their counterpart in gyro vibrator 10 as shown in FIG. 1(b) of the first embodiment.

The lead wires 75A and 75B bend into a shape corresponding into a shape of the letter "Z", and lead wires (not shown) corresponding to the lead wires 16A and 16B of the first embodiment also bend likewise. The bending shape can be obtained by, for example, pushing down on the gyro vibrator 70 towards the supporting substrate 77 after mounting the gyro vibrator 70 on the lead wires 75A and 75B fixed to the supporting substrate 77.

Figure 8:
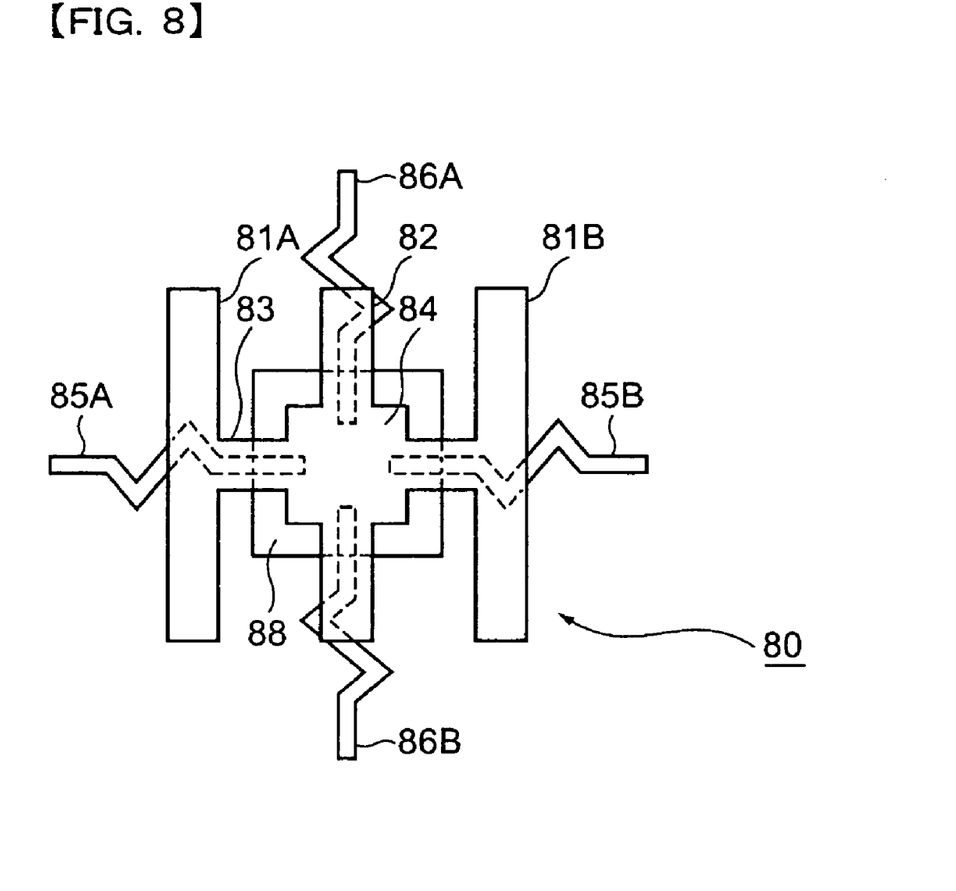
FIG. 8 is a plan view showing a structure of another vibrator unit according to the fourth embodiment of the invention.

FIG. 8 is a plan view of yet another vibrator unit according to a fourth embodiment of the present invention. As shown in FIG. 8, gyro vibrator 80 comprises a first drive arm 81A, a second drive arm 81B, a detection arm 82, an arm supporting section 83, and a supporting board 84 respectively each having substantially the same function as the counterpart first drive arm 11A, the second drive arm 11B, the detection arm 12, the arm supporting section 13, and the supporting board 14 forming the gyro vibrator 10 shown in FIG. 1(A).

The gyro vibrator 80 is supported by lead wires 85A and 85B for supporting the gyro vibrator 80 in the X direction and lead wires 86A and 86B for supporting the gyro vibrator 80 in the Y direction as is the case with the gyro vibrator 10 in which the supporting board 14 is supported by the lead wires 15A, 15B, 16A, and 16B. The lead wires 85A, 85B, 86A, and 86B bend in response to a horizontal force into substantially the shape of the letter "Z." That is, in contrast to the lead wires 75A and 75B bending vertically, the lead wires 85A, 85B, 86A, and 86B bend horizontally.

As described above, according to the vibrator unit of the fourth embodiment, since the lead wires 75A, 85A and others bend, the characteristic resonance frequencies of the lead wires 75A, 85A and others are lower than those of conventional lead wires without bending shapes. Thus, since the vibration of the detection arm along the X direction necessary for detecting the Coriolis force acting on the drive arms can be prevented from being hindered, the amplitude of rotation applied from outside can be detected with greater accuracy compared to a conventional vibrator unit.

Furthermore, by using the lead wires having the Z-shapes in the horizontal direction instead of the lead wires 75A and 75B having the Z-shapes in height-wise, namely the vertical direction, substantially the same advantages as described above can be obtained.

In the supporting mechanisms according to the present invention, the characteristic resonance frequency of vibration along at least one of the first and the second directions is lower than the characteristic resonance frequency of vibration along a direction other than the at least one of the first and the second directions. Therefore, the supporting mechanism can support the vibrator without limiting or inhibiting the vibration of the vibrator along the at least one of the first and the second directions while maintaining the reliability of the gyro-vibrator such as its shock proof property. This is accomplished by using an elastic mechanism for the lead wires having a relatively high characteristic resonance frequency in the at least one of the first and the second directions.

What we claim is:

1. A vibrator supporting mechanism for supporting a gyro-vibrator spatially apart from a substrate along a first and/or second direction with the gyro-vibrator comprising a drive section to which a Coriolis force is applied upon an angular rotation of the gyro-vibrator with the drive section vibrating in a first direction, a detection section vibrating in a second direction perpendicular to said first direction in response to said Coriolis force and said gyro-vibrator rotating about an axis in a third direction perpendicular to said first and second directions and a support section for supporting said drive section and said detection section relative to the substrate, wherein:

the drive section comprises a first and a second drive arm disposed parallel to each other;

the detection section comprises a detection arm disposed between and parallel to the first and the second drive arm sections;

and having an arm supporting section with opposite ends in which one end is connected to the first drive arm section, the opposite end connected to the second drive arm section, and with the arm supporting section connected at an intermediate location to the detection arm; and wherein the vibrator supporting mechanism comprises a first elastic mechanism for supporting the arm supporting section along either said first or second directions and having a characteristic resonance frequency of vibration along the first direction that is lower than the characteristic resonance frequency of vibration along the third direction.

2. A vibrator supporting mechanism according to claim 1 further comprising a second elastic mechanism for supporting the arm supporting section along a direction perpendicular to the direction supported by said first elastic mechanism.

3. A vibrator supporting mechanism according to claim 2, wherein the characteristic resonance frequency of vibration of the second elastic mechanism is different from the characteristic resonance frequency of vibration of the first elastic mechanism.

4. A vibrator supporting mechanism according to claim 3, wherein the width of the second elastic mechanism is narrower then the width of the first elastic mechanism.

5. A vibrator supporting mechanism according to claim 3, wherein each of the first and the second elastic mechanisms has a section having a different width from each other.

6. A vibrator supporting mechanism according to claim 3, wherein each of the first and the second elastic mechanisms is uneven in width.

7. A vibrator supporting mechanism according to claim 3, wherein each of the first and the second elastic mechanisms has a narrower section than the rest thereof.

8. A vibrator supporting mechanism according to claim 3, wherein each of the first and the second elastic mechanisms has a hollow section.

9. A vibrator supporting mechanism according to claim 3, wherein each of the first and the second elastic mechanisms has a flectional section.

10. A vibrator supporting mechanism according to claim 3, wherein said first elastic mechanism is of a material composition different from the material composition of the second elastic mechanism such that the characteristic resonance frequency of the second elastic mechanism is different from the characteristic resonance frequency of the first elastic mechanism.

11. A vibrator unit including a supporting mechanism for supporting a gyro-vibrator upon a substrate in said vibrating unit with said gyro-vibrator comprising a drive section to which a Coriolis force is applied upon an angular rotation of the gyro-vibrator with the drive section vibrating in a first direction, a detection section vibrating in a second direction perpendicular to said first direction in response to said Coriolis force and in accordance with the magnitude of said Coriolis force for detecting the strength of the Coriolis force with said gyro-vibrator rotating about an axis in a third direction perpendicular to said first and second directions and including a support section for supporting said drive section and said detection section relative to the substrate, wherein said supporting mechanism supports the gyro-vibrator via the support section and comprises a characteristic resonance frequency of vibration along the first direction that is lower than a characteristic resonance frequency of vibration along the third direction.

12. A vibrator unit including a supporting mechanism for supporting a gyro-vibrator upon a substrate in said vibrating unit with said gyro-vibrator comprising a drive section to which a Coriolis force is applied upon an angular rotation of the gyro-vibrator with the drive section vibrating in a first direction, a detection section vibrating in a second direction perpendicular to said first direction in response to said Coriolis force and in accordance with the magnitude of said Coriolis force for detecting the strength of the Coriolis force with said gyro-vibrator rotating about an axis in a third direction perpendicular to said first and second directions and including a support section for supporting said drive section and said detection section relative to the substrate, wherein the drive section comprises first and second drive arm sections shaped like rods disposed in a direction parallel to the third direction and being parallel to each other, and a drive arm supporting section shaped like a rod having two opposite ends, with one end thereof connected to the first drive arm section, the opposite end connected to the second drive arm section, and with the drive arm supporting section being connected at an intermediate location thereof to the detection section, wherein the detection section comprises a detection arm shaped like a rod disposed between and parallel to the first and the second drive arm sections, and wherein said supporting mechanism comprises a first elastic mechanism for supporting the gyro-vibrator and for supporting the drive arm supporting section and the detection arm section at the center thereof.

* * * * *